United States Patent
Kuhley et al.

(10) Patent No.: US 10,232,751 B2
(45) Date of Patent: Mar. 19, 2019

(54) METHOD FOR PRODUCING A SUPPORT STRUCTURE FOR THE BACKREST OF A MOTOR VEHICLE SEAT AND SUPPORT STRUCTURE FOR THE BACKREST OF A MOTOR VEHICLE SEAT

(71) Applicant: GM GLOBAL TECHNOLOGY OPERATIONS LLC, Detroit, MI (US)

(72) Inventors: Christian Kuhley, Ruesselsheim (DE); Juergen Maier, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/383,756

(22) Filed: Dec. 19, 2016

(65) Prior Publication Data
US 2017/0174109 A1 Jun. 22, 2017

(30) Foreign Application Priority Data
Dec. 18, 2015 (DE) .................. 10 2015 016 488

(51) Int. Cl.
*B60N 2/68* (2006.01)
*B60N 2/72* (2006.01)

(52) U.S. Cl.
CPC ............ *B60N 2/68* (2013.01); *B60N 2/682* (2013.01); *B60N 2/686* (2013.01); *B60N 2/72* (2013.01)

(58) Field of Classification Search
CPC . B60N 2/68; B60N 2/72; B60N 2/682; B60N 2/686
See application file for complete search history.

(56) References Cited

U.S. PATENT DOCUMENTS

| | | | |
|---|---|---|---|
| 4,746,168 A * | 5/1988 | Bracesco | B60N 2/5816 297/284.11 |
| 4,861,104 A * | 8/1989 | Malak | B60N 2/5825 297/218.3 |
| 6,131,984 A | 10/2000 | Matsushita | |
| 6,241,188 B1 * | 6/2001 | Simpson | B60N 2/6027 244/122 R |
| 6,619,533 B1 * | 9/2003 | Hootman | B23P 13/04 228/112.1 |
| 9,108,554 B2 | 8/2015 | Gross et al. | |

FOREIGN PATENT DOCUMENTS

| | | |
|---|---|---|
| DE | 3706394 C1 | 5/1988 |
| DE | 19728052 A1 | 1/1999 |
| JP | H09156407 A | 6/1997 |

OTHER PUBLICATIONS

Machine Translation of Brosinger, DE3706394C1, May 11, 1988.*
Erman Patent Office, German Search Report for German Application No. 102015016488.0, dated Mar. 7, 2016.

* cited by examiner

Primary Examiner — Ryan J. Walters
(74) Attorney, Agent, or Firm — Lorenz & Kopf, LLP

(57) ABSTRACT

A method is disclosed for producing a support structure for the backrest of a motor vehicle seat. At least one extruded profile, which is elongated in a longitudinal direction, is prepared and separated transversely to the longitudinal direction into a plurality of extruded profile supports. At least two extruded profile supports are spaced apart in the longitudinal direction with respect to one another and connected to one another by at least one strut extending in the longitudinal direction.

14 Claims, 3 Drawing Sheets

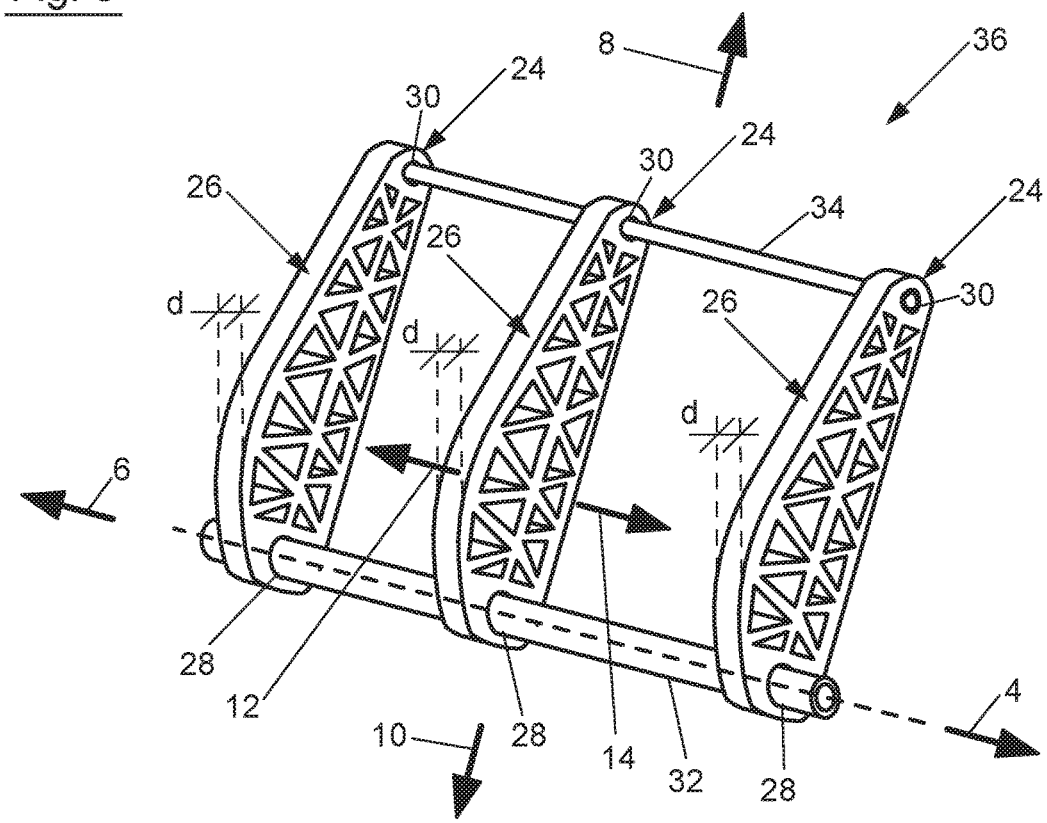
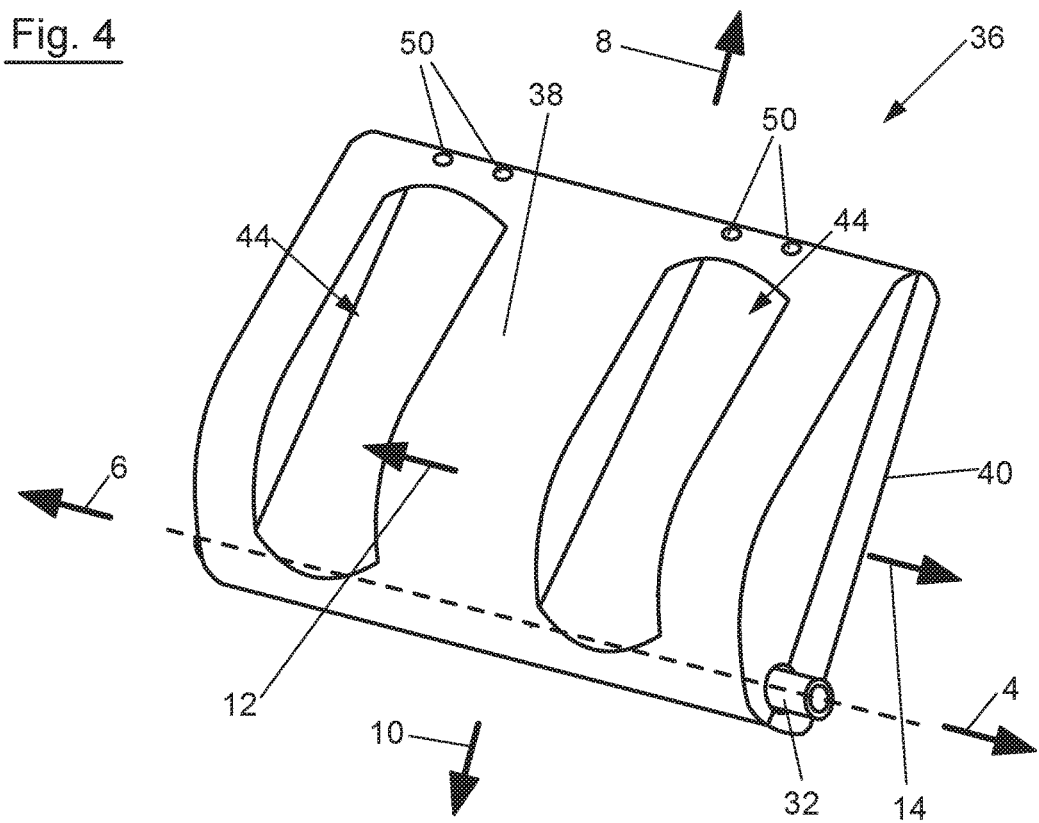

METHOD FOR PRODUCING A SUPPORT STRUCTURE FOR THE BACKREST OF A MOTOR VEHICLE SEAT AND SUPPORT STRUCTURE FOR THE BACKREST OF A MOTOR VEHICLE SEAT

CROSS-REFERENCE TO RELATED APPLICATION

This application claims priority to German Patent Application No. 102015016488.0, filed Dec. 18, 2015, which is incorporated herein by reference in its entirety.

TECHNICAL FIELD

The present disclosure pertains to methods for producing a support structure for the backrest of a motor vehicle seat as well as methods for producing a backrest with such a support structure. Furthermore, the technical field relates to support structures for the backrest of a motor vehicle seat as well as backrests for a motor vehicle seat.

BACKGROUND

Backrests for motor vehicle seats which have an interior support structure are generally known. Usually these support structures are configured to be U-shaped or O-shaped and are composed of metal struts.

There is a need in the art to provide a method for producing a support structure for the backrest of a motor vehicle seat as well as a method for producing a backrest for a motor vehicle seat which is easy to implement, which enables the rapid manufacture of similar support structures or backrests and which ensures a uniformly light-weight and stable structure of the support structure as well as the backrest. Furthermore, there is a need in the art to provide a support structure for a backrest and a backrest which is easy to manufacture, which has a light-weight structure and which is configured to be particularly stable.

SUMMARY

One embodiment of the present disclosure relates to a method for producing a support structure for the backrest of a motor vehicle seat. Firstly at least one extruded profile elongated in a longitudinal direction is provided. The extruded profile includes a profile which has been produced by extrusion molding. The longitudinal direction can in this case also be designated as the extrusion molding direction. The extruded profile is separated transversely to the longitudinal direction into a plurality of extruded profile supports. The separation can be accomplished in this case, for example, by cutting methods, preferably by sawing. However, other separation methods which are suitable for separating the extruded profile into a plurality of extruded profile supports also come into consideration. The at least two extruded profile supports thus produced are spaced apart from one another in the longitudinal direction, and then connected to the two extruded profile supports by at least one strut extending in the longitudinal direction to create the support structure. The method enables a particularly simple and rapid fabrication of the support structure, where thanks to the two extruded profile supports a high stability or stiffness of the support structure can be achieved. Thus, a method is provided in which a plurality of different support structures can be created without major expenditure, especially as the spacing of the extruded profile supports in the longitudinal direction relative to one another can be varied relatively simply. Accordingly, a method for creating a modularly constructed support structure is provided.

In a preferred embodiment of the method, the extruded profile is prepared as a hollow profile, which has at least one cavity extending in the longitudinal direction inside the extruded profile to be able to create with the aid of the method in a particularly simple manner, a support structure which has a light-weight and nevertheless stable structure.

In an advantageous embodiment of the method, the extruded profile configured as a hollow profile preferably has at least two, three or more cavities extending in the longitudinal direction inside the extruded profile to achieve the afore-mentioned advantage of a light-weight structure and create a uniformly stable and stiff extruded profile support of the support structure. The latter can also be attributed to the framework-like structure between the two, three or more cavities extending in the longitudinal direction inside the extruded profile.

In a particularly preferred embodiment of the method, the at least one prepared extruded profile has at least one fastening space extending in the longitudinal direction inside the extruded profile which can be formed, for example, by one of the cavities. The separation of the at least one extruded profile is made by creating a fastening opening forming a section of the respective fastening space in the respective extruded profile support. During connection of the at least two extruded profile supports, the strut is inserted into the fastening openings of the extruded profile supports and/or is guided through the fastening openings. In other words, the at least one extruded profile already provides the fastening spaces required for creating the fastening openings for the struts so that manufacture is further simplified. In this connection, a fastening space or a fastening opening has proved to be advantageous which has a circular cross-section to be able to simply receive a strut with corresponding circular cross-section. In principle, however, cross-sections which deviate from a circular shape are also possible, as will be taken up again hereinafter.

In a further preferred embodiment of the method, the strut inserted in the fastening openings or guided through the fastening openings is fastened in a torque-proof manner to the extruded profile supports. Here it can be advantageous if the struts and the fastening openings have a cross-section which differs from a circle whilst the cross-sections otherwise substantially correspond so that a torque-proof fastening of the struts to the extruded profile supports can already be achieved by the insertion or/and guiding through.

In a further advantageous embodiment of the method, the fastening of the strut to the extruded profile supports is accomplished non-positively or/and positively, optionally by means of a press fit, or/and in a firmly bonded manner, optionally by welding, soldering or adhesive bonding in order to further simplify the method and achieve a fastening whilst maintaining the spacing of the two extruded profile supports in the longitudinal direction to one another. In a particularly advantageous embodiment of the method, the prepared extruded profile transversely to the longitudinal direction thereof has an extension in the width direction and an extension in the depth direction, wherein the extension in the width direction is greater than the extension in the depth direction. By this means an extruded profile or an extruded profile support is created which is suitable for forming the height strut of the support structure for the backrest.

According to a further preferred embodiment of the method, the prepared extruded profile has a depth in the depth direction which varies in the width direction. Thus, by the extruded profile and/or the extruded profile support separated from the extruded profile, a backrest contour facing the vehicle passenger can be predefined without major expenditure.

According to a further advantageous embodiment of the method, at least one cover plate is fastened to the extruded profile supports to further increase on the one hand the strength and stiffness of the support structure and on the other hand to create a support surface on the support structure which ensures secure supporting of the vehicle passenger. Since the at least one cover plate—as the name already indicates—is configured to be plate-shaped, a light-weight structure of the support structure is still maintained, therefore also a light-weight structure of the backrest into which the support structure is to be integrated.

In a further advantageous embodiment of the method, the at least one cover plate is fastened to the extruded profile supports in such a manner that this delimits a cavity in the longitudinal direction between the extruded profile supports transversely to the longitudinal direction. The cavity here ensures not only a light-weight structure of the support structure but this can also serve as receiving space for further functional parts of the motor vehicle or the motor vehicle seat without there being the risk of damage to the components inside the cavity, especially as this is securely covered by the at least one cover plate.

According to a further preferred embodiment of the method, at least one front cover plate and a rear cover plate are fastened to the extruded profile supports to further simplify the production process. In this case, the front and rear cover plate should preferably be fastened to the extruded profile supports in such a manner that these delimit the cavity already mentioned previously in mutually opposite directions.

In a further advantageous embodiment of the method, the at least one cover plate is fastened to the extruded profile supports by supporting on an outer edge of the extruded profile supports, i.e. for example on an edge pointing in the width and/or depth direction.

According to a further advantageous embodiment of the method, the at least one cover plate is fastened to the extruded profile supports by introducing a trough-shaped depression in the cover plate into the cavity. In this case, the trough-shaped depression can already be provided in the cover plate before the cover plate is fastened to the extruded profile supports by introducing the trough-shaped depression into the cavity. However, it is also possible, if not even advantageous, to produce the trough-shaped depression in the cover plate during or by fastening the cover plate to the cavity in order to achieve a fastening of the cover plate to the extruded profile supports by introducing the trough-shaped depression into the cavity between the extruded profile supports where this can be achieved, for example, by vacuum forming or/and pressing, as will be explained hereinafter.

In a further preferred embodiment of the method, the at least one cover plate is heated and is fastened to the extruded profile supports by deformation of the same. Here it is preferred if the deformation is accomplished by vacuum forming. Thus, for example a temporary vacuum can be produced during fastening which brings about a corresponding deformation of the heated cover plate. Alternatively or additionally the deformation can also be accomplished by pressing, for example inside a corresponding press mold.

Although fundamentally any material can be used for the extruded profile, in particular any metal material, it is preferred if the extruded profile, therefore also the individual extruded profile support, is made of aluminum in order to achieve a particularly light-weight and nevertheless stable construction of the support structure. According to a further advantageous embodiment of the method, the cover plates are made of plastic in order to achieve a uniformly stable and light-weight structure. In principle, however the cover plates can also be made of metal. In order to create a particularly low weight of the support structure in the region of the struts of the support structure with uniformly high stability, in a further advantageous embodiment of the method, a tube, preferably a cylindrical tube is used as a strut.

As already set out previously, at least one extruded profile is prepared to produce the support structure. In other words, in principle a plurality of extruded profiles can also be prepared here from which extruded profile supports are separated in order to be able to process these extruded profile supports in a common support structure. Thus, extruded profiles can in particular be differently shaped or/and constructed in order to cope with different accommodation situations within the same support structure. In a further preferred embodiment of the method, the extruded profile supports of the same extruded profile are used to produce the individual support structure. In other words, extruded profile supports of the same shape and size are used to produce the individual support structure regardless of whether these were separated from the same extruded profile or not. Nonetheless, in this embodiment it is particularly preferred if the extruded profile supports are separated from the same extruded profile in order to use these to produce the individual support structure.

A further embodiment of the present disclosure relates to a method for producing a backrest for a motor vehicle seat including the process steps according to one embodiment of the previously described method for producing a support structure. The process further includes fastening a cushion to the support structure. The cushion preferably includes a foam cushion. Furthermore, it is preferred if the fastening of the cushion to the support structure takes place by covering at least one of the cover plates of the support structure. Alternatively or additionally, at least one functional component is fastened to at least one of the extruded profile supports of the support structure. The functional component preferably includes a belt reel, a belt lock or an armrest. In this embodiment, it is furthermore preferred if the functional component is arranged at least partially inside the aforementioned cavity of the support structure.

A further embodiment of the present disclosure relates to a support structure for the backrest of a motor vehicle seat including a support structure which can be produced or is produced according to the method according to the present disclosure. The support structure includes at least two extruded profile supports which are separated by at least one elongated extruded profile in the longitudinal direction transversely to the longitudinal direction and which are spaced apart from one another in the longitudinal direction, and include at least one strut extending in the longitudinal direction by which the extruded profile supports are connected to one another or are fastened to one another. With regard to further embodiments of the support structure and its advantages reference is made to the preceding description of the method for producing a support structure which applies accordingly for the support structure.

Another embodiment of the present disclosure relates to a backrest for a motor vehicle seat having a support structure of the type according to the present disclosure. In a preferred embodiment of the backrest, a cushion, optionally a foam cushion, is fastened to the support structure for covering the support structure, particularly preferably for covering at least one of the cover plates.

BRIEF DESCRIPTION OF THE DRAWINGS

The present disclosure will hereinafter be described in conjunction with the following drawing figures, wherein like numerals denote like elements.

FIG. 3 shows a perspective view of the extruded profile supports from FIG. 2 after connecting the same by means of two struts to create a support structure;

FIG. 4 shows the support structure from FIG. 3 after fastening cover plates onto the extruded profile supports;

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
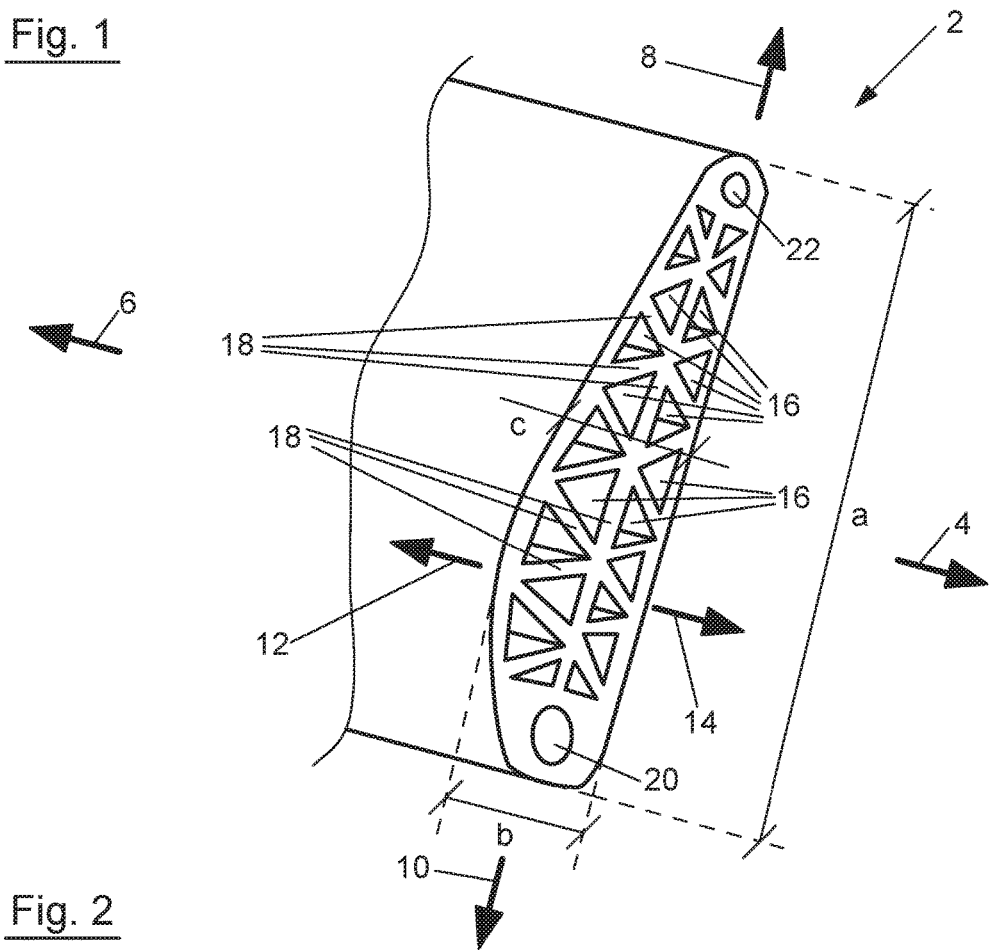
FIG. 1 shows a partial view of an extruded profile in perspective view.

In the course of the method for producing a support structure for the backrest of a motor vehicle seat, firstly at least one extruded profile 2 is prepared or produced by extrusion molding. The extruded profile 2 is configured to be elongated in a longitudinal direction 4, 6 where the longitudinal direction 4, 6 can also be designated as the extrusion molding direction of the extruded profile 2. In addition, the extruded profile 2 has in addition to the mutually opposite longitudinal directions 4, 6 the mutually opposite width directions 8, 10 and at right angles to the width directions 8, 10 the mutually opposite depth directions 12, 14. The extruded profile 2 also has an extension a in the width direction 8, 10, wherein the extension a in the width direction 8, 10 is greater than an extension b of the extruded profile 2 in the depth direction 12, 14. Furthermore it can be seen from FIG. 1 that the depth c of the extruded profile 2 in the depth direction 12, 14 is configured in such a manner that the depth c varies in the width direction 8, 10. The extruded profile 2 in the embodiment shown is made of metal, preferably of aluminum.

The extruded profile 2 is prepared as a so-called hollow profile which includes at least one cavity extending in the longitudinal direction 4, 6 inside the extruded profile 2. As can be seen from FIG. 1, the extruded profile 2 in the depicted embodiment includes a plurality of cavities 16 extending in the longitudinal direction 4, 6 inside the extruded profile 2 which in the depicted embodiment have a triangular cross-section. The cavities 16 are separated from one another in the width direction 8, 10 or/and in the depth direction 12, 14 by dividing walls 18 of the extruded profile 2, wherein the dividing walls 18 form a framework-like structure. Furthermore, the prepared extruded profile 2 has at least one fastening space extending in the longitudinal direction 4, 6 inside the extruded profile 2, wherein the fastening spaces 20 and 22 are provided in the depicted embodiment. In this case the fastening space 20 is arranged substantially in the region of the end pointing in the width direction 10 whereas the fastening space 22 is provided in the region of the end of the extruded profile 2 pointing in the width direction 8. The two fastening spaces 20, 22 each have a circular cross-section.

Figure 2:
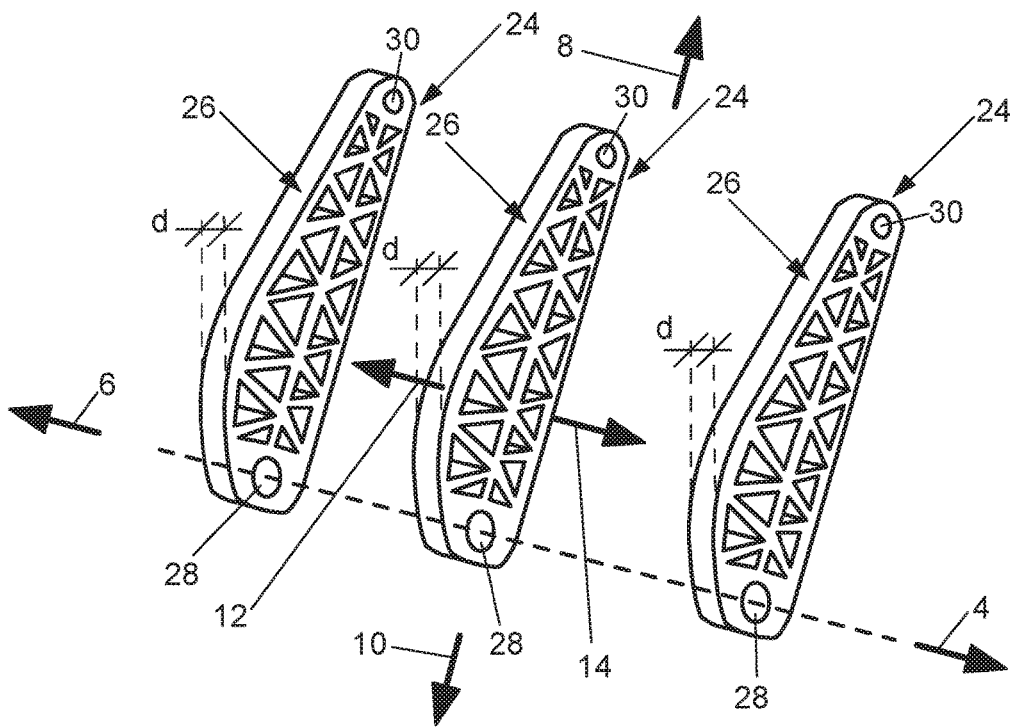
FIG. 2 shows the extruded profile from FIG. 1 separated into a plurality of extruded profile supports.

The extruded profile 2 prepared in such a manner is then separated into a plurality of extruded profile supports 24 transversely to the longitudinal direction 4, 6, here in planes spanned by the width direction 8, 10 and the depth direction 12, 14, which are shown in FIG. 2. The separation can be made here by means of any separating method, wherein a cutting, in particular a sawing, has proved particularly advantageous. The extruded profile supports 24 have a thickness d in the longitudinal directions 4, 6 which is preferably less than the extension a in the width direction 8, 10 and the extension b in the depth direction 12, 14. Also the outer side of the extruded profile 2 previously pointing in the width direction 8, 10 and depth direction 12, 14 in each case forms an outer edge 26 of the respective extruded profile support 24. The separation of the extruded profile 2 is made by dividing the fastening spaces 20, 22 into fastening openings 28, 30 in the respective extruded profile support 24. Accordingly, the fastening openings 28 are each formed by a section of the fastening space 20 whereas the fastening openings 30 are each formed by a section of the fastening space 22.

In the further production process, the extruded profile supports 24 are spaced apart from one another in the longitudinal direction 4, 6, wherein on the one hand, the fastening openings 28 and on the other hand the fastening openings 30 are arranged in alignment with one another in the longitudinal direction 4, 6, as can be deduced from FIG. 2.

Then the at least two extruded profile supports 24 are connected to one another by means of a strut extending in the longitudinal direction 4, 6, as indicated in FIG. 3. Thus, a strut 32 is introduced into the fastening openings 28 or guided through these whilst a strut 34 is guided through the fastening openings 30 or introduced into these. The two struts 32, 34 are preferably configured as tubes or tubular, and also have a circular cross-section. In addition, the struts 32 introduced into the fastening openings 28 or guided through the fastening openings 28 are fastened in a torque-proof manner to the extruded profile supports 24, wherein the fastening can preferably be accomplished, for example, non-positively or/and positively, optionally by means of a press fit or/and in a firmly bonded manner, optionally by welding, soldering or adhesive bonding. The struts 34 introduced into the fastening openings 30 or guided through the fastening openings 30 can be fastened in a corresponding manner to the extruded profile supports 24. In principle, here only the strut 32 is required here whilst the additional strut 34 has the advantage of a further stabilization. The strut 32 should also form the subsequent pivot axis of the support structure 36 thus formed, where the ends projecting in the longitudinal directions 4, 6 could be received in a corresponding vehicle-side bearing. The strut 34 here need not necessarily be connected to the respective extruded profile support 24 in a torque-proof manner. In principle, however, the strut 34 can be fastened in the same way as the strut 32 to the extruded profile supports 24 and connected to these.

Figure 5:
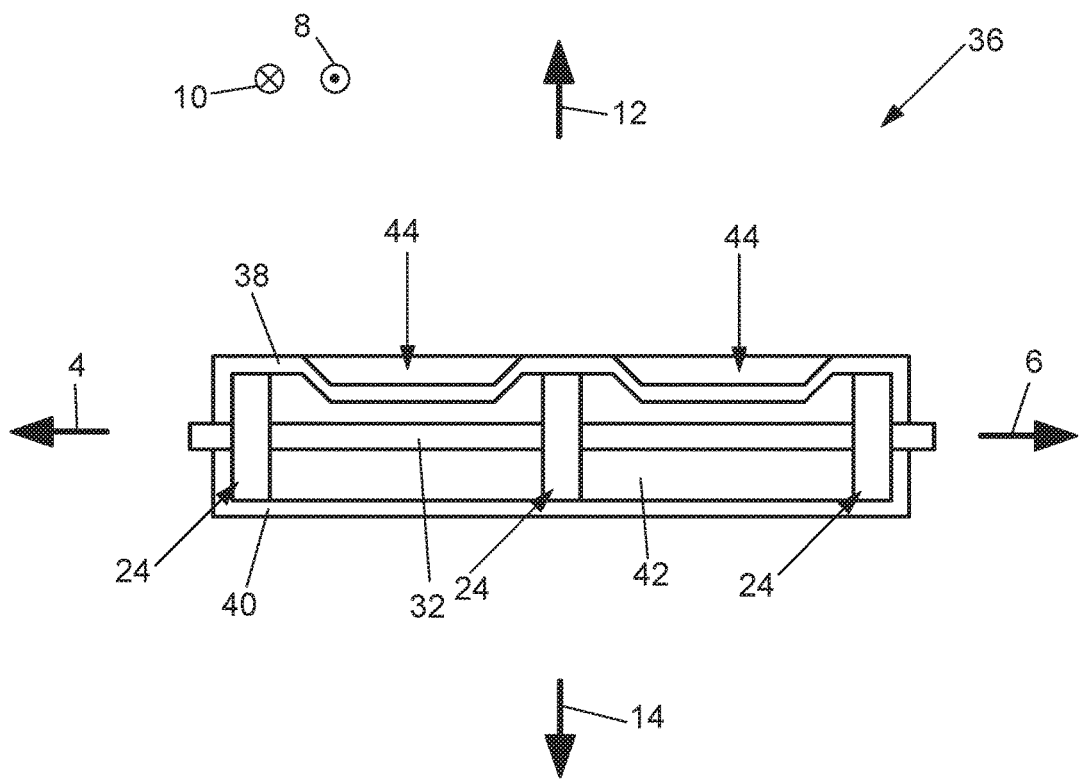
FIG. 5 shows a cross-sectional view of the support structure from FIG. 4.

In a further process, at least one cover plate is fastened to the extruded profile supports 24 of the support structure 36 which preferably consists of or is made of plastic. In the embodiment shown as can be seen in particular from FIGS. 4 and 5, a front cover plate 38 is fastened in a supporting manner to the section of the outer edges 26 pointing in the depth direction 12 whilst a rear cover plate 40 is fastened in a supporting manner to the outer section 26 of the extruded profile supports 24 pointing in the depth direction 14. The cover plates 38, 40 delimit a cavity 42 formed in the longitudinal direction 4, 6 between the extruded profile supports 24 transversely to the longitudinal direction 4, 6. Thus, the front cover plate 38 delimits the cavity 42 in the depth direction 12 whilst the rear cover plate 40 delimits the cavity 42 in the depth direction 14. In other words, the front and rear cover plate 38, 40 delimit the cavity 42 in mutually opposite directions. As can be seen from FIG. 5, the cover plates 38, 40 are thereby supported on the outer edge 26 of the extruded profile supports 24.

The front cover plate 38 has trough-like depressions 44 whereby the trough-like depressions 44 are set back in such a manner to project into the cavity 42 or are introduced into this during fastening of the front cover plate 38 to the extruded profile supports 24. The trough-like depressions 44 can already be provided in the front cover plate 38 before this is fastened to the extruded profile supports 24. It is also possible to produce the trough-like depressions 44 during fastening of the front cover plate 38 to the extruded profile supports 24. Here it is preferred if the front cover plate 38 and the rear cover plate 40 are heated and fastened to the extruded profile supports 24 during deformation of the same. The deformation can take place here for example by vacuum forming in which—at least temporarily during the fastening step—a vacuum is produced in the region of the cavity 42 to cause sections of the front cover plate 38 to bulge into the cavity 42 and thus create the trough-like depressions 44. Alternatively or additionally, the cover plates 38, 40 can be deformed by pressing and fastened to the extruded profile supports 24, where in the last-mentioned case a corresponding mold should be used.

As can be seen from FIG. 4, receptacles 50 for head supports not shown in detail can be provided in at least one of the cover plates 38, 40, wherein in the embodiment shown the receptacles 50 are provided in the front cover plate 38 in the region pointing in the width direction 8.

Thus, the support structure 36 is substantially completed. In a further process for producing the backrest, a cushion can be fastened to the support structure 36. As can be seen from FIG. 6, for this purpose a cushion 46, preferably a foam cushion, can be fastened to the support structure 36, more precisely to the outwardly pointing side of the front cover plate 38, where this is accomplished by covering the front side of the front cover plate 38. Since the seat contour is already predefined by the shaping of the front cover plate 38, the cushion 46 can have a substantially uniform thickness e. Accordingly a cushion or cover 48 can be fastened to the support structure 36, which covers the rear cover plate 40.

Figure 6:
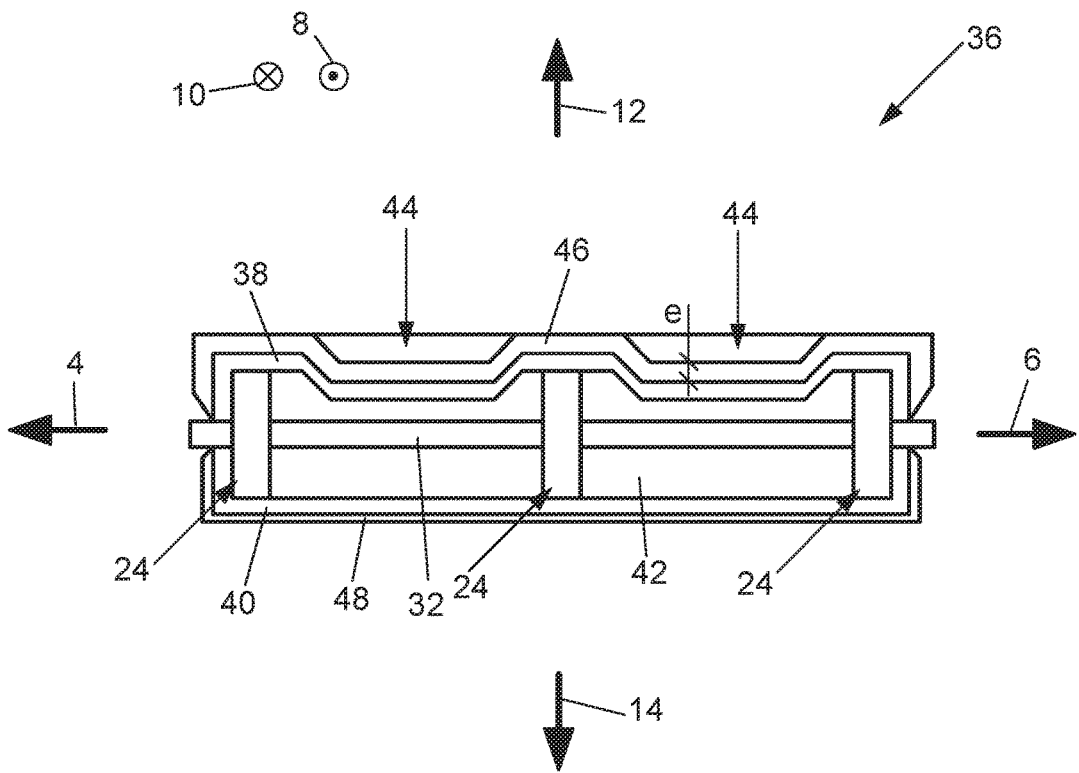
FIG. 6 shows the cross-section view from FIG. 5 after attaching a cushion to the support structure.

Although not shown in detail in FIG. 6, it is further preferred if additional functional components, in particular functional components of a motor vehicle seat such as for example a belt reel, a belt lock or an armrest, are fastened to at least one of the extruded profile supports 24 of the support structure 36, wherein the said functional components are preferably arranged at least partially inside the cavity 42.

In the embodiment shown the extruded profile supports 24 of the same extruded profile 2 were used to produce the individual support structure 36. However, it is also possible to use extruded profile supports 24 of two or more extruded profiles to produce the individual support structure. The extruded profiles in this case can be configured to be the same, i.e. in particular can have the same measurements or/and the same shape. Alternatively, however it is possible that two or more extruded profiles are not the same but differ from one another in dimensions and/or shape, in order to use extruded profile supports which differ from one another in dimensions or/and shape to produce a single support structure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A method for producing a support structure for a backrest of a motor vehicle seat comprising:
    extruding at least one extruded profile, which is elongated in a longitudinal direction;
    separating the at least one extruded profile transversely to the longitudinal direction into a plurality of extruded profile supports;
    spacing apart at least two extruded profile supports in the longitudinal direction with respect to one another;
    connecting the at least two extruded profile supports to one another by at least one strut extending in the longitudinal direction; and
    fastening at least one cover plate to the extruded profile supports by introducing a trough-shaped depression in the cover plate into a cavity extending in the longitudinal direction within a boundary of the extruded profile, wherein the at least one cover plate delimits the cavity in the longitudinal direction between the extruded profile supports transversely to the longitudinal direction.

2. The method for producing a support structure according to claim 1, wherein extruding at least one extruded profile comprises preparing an extruded profile as a hollow profile having at least one cavity extending in the longitudinal direction within a boundary of the extruded profile.

3. The method for producing a support structure according to claim 2, further comprising preparing an extruded profile as a hollow profile having a plurality of cavities extending in the longitudinal direction within a boundary of the extruded profile.

4. The method for producing a support structure according to claim 1, further comprising preparing an extruded profile as a hollow profile having at least one fastening space extending in the longitudinal direction within a boundary of the extending profile, and inserting the strut into the fastening space.

5. The method for producing a support structure according to claim 4, further comprising fastening the strut inserted in the fastening openings in a torque-proof manner to the extruded profile supports.

6. The method for producing a support structure according to claim 1, wherein the at least one extruded profile is provided having an extension in the width direction which is greater than an extension of the extruded profile in the depth direction.

7. The method for producing a support structure according to claim 6, wherein the extruded profile has a depth in the depth direction that varies along the width direction.

8. The method for producing a support structure according to claim 1, further comprising attaching at least one front and rear cover plate to the extruded profile supports to delimit the cavity in opposite directions.

9. The method for producing a support structure according to claim 1, wherein the at least one cover plate is fastened to the extruded profile supports by supporting on an outer edge of the extruded profile supports.

10. The method for producing a support structure according to claim 1, further comprising extruding the at least one extruded profile from aluminum, wherein the at least one cover plate is a plastic cover plate and the at least one strut is a tubular strut.

11. The method for producing a support structure according to claim 1, wherein the at least two extruded profile supports are provided from the same extruded profile.

12. The method for producing a support structure in the form of a backrest for a motor vehicle seat according to claim 1, further comprising fastening a cushion to the support structure.

13. The method for producing a support structure in the form of a backrest for a motor vehicle seat according to claim 12, further comprising fastening at least one seating component to at least one of the extruded profile supports.

14. The method according to claim 1, further comprising:
- heating the at least one cover plate to provide a heated cover plate; and
- deforming the heated cover plate for fastening to the extruded profile supports.

* * * * *